(12) United States Patent
Théorêt et al.

(10) Patent No.: US 6,514,889 B1
(45) Date of Patent: Feb. 4, 2003

(54) SOUND AND THERMAL INSULATING NON-WOVEN SYNTHETIC SHEET MATERIAL

(75) Inventors: Richard Théorêt, Montréal (CA); Alain Poirier, St-Luc (CA); Robert Ducharme, Ste-Anne-des Plaines (CA)

(73) Assignee: Soleno Textiles Technique Inc., Laval ( * ) Notice: Subject to any disclaimer, the term of this patent is extended or adjusted under 35 U.S.C. 154(b) by 104 days.

(21) Appl. No.: 09/585,481

(22) Filed: Jun. 2, 2000

(51) Int. Cl.⁷ ................................................. D04H 1/08
(52) U.S. Cl. ..................... 442/320; 442/324; 442/388; 442/394; 442/395; 442/402
(58) Field of Search ................................ 442/320, 324, 442/388, 394, 395, 402

(56) References Cited

U.S. PATENT DOCUMENTS

| | | | |
|---|---|---|---|
| 3,307,990 A | | 3/1967 | Homier et al. |
| 4,433,019 A | | 2/1984 | Chumbley |
| 4,927,705 A | * | 5/1990 | Syme et al. ............... 428/282 |
| 5,547,731 A | | 8/1996 | Tesch |
| 5,806,154 A | | 9/1998 | Tolbert |
| 6,092,622 A | * | 7/2000 | Hiers et al. ............... 181/290 |
| 6,191,057 B1 | * | 2/2001 | Patel et al. ............... 442/398 |

FOREIGN PATENT DOCUMENTS

JP 06-023889 * 2/1994 ............. B32B/5/06

* cited by examiner

Primary Examiner—Terrel Morris
Assistant Examiner—Leanna Roché
(74) Attorney, Agent, or Firm—Ogilvy Renault; Guy J. Houle

(57) ABSTRACT

A non-woven synthetic sheet material for use in sound insulation and/or thermal insulation is described. The sheet material is a felt or mat of substantially uniform synthetic fiber thickness and defines opposed flat surfaces. The sheet material is needle-punched from at least one of the opposed flat surfaces thereof to cause the synthetic fibers to intertwine to form a pliable sound and/or thermal insulating sheet. The insulating sheet has a density in the range of from about 100 to 1500 g/m² and a homogeneous integrity resistant to fragmentation. Preferably a polymeric film is interconnected to a surface of the synthetic fiber sheet by a further needle punch step the polymeric film is preferably a metalized polyethylene film. The material has a multitude of uses in the construction industry. The felt may also be provided in strip form for use in the framing of wooden structures to sound insulate interconnected parts.

7 Claims, 3 Drawing Sheets

SOUND AND THERMAL INSULATING NON-WOVEN SYNTHETIC SHEET MATERIAL

FIELD OF THE INVENTION

The present invention relates to a non-woven synthetic sheet material for use in sound and thermal insulation and wherein the synthetic sheet material or felt is formed of a uniform synthetic fiber mat which is needle-punched and wherein, preferably but not exclusively, a metalized polyethylene film may be secured to a surface thereof by a further needle punch step. The synthetic sheet material is preferably used in the construction industry to insulate floors, walls, and other surfaces and to also insulate several construction materials, such as pipes or domestic appliances to thermally and sound insulate them, such as a covering for a dishwasher.

BACKGROUND OF THE INVENTION

Sound absorbing materials for use in the construction industry are known and many of these utilize rubberized materials or cork. We usually find these materials as a sub layer in the construction of floors or partition walls. Some of these materials are identified by the trademarks Enkasonic® and Acousti-mat® and cork materials that provide acceptable sound damping but their cost is high and they are difficult to install. These materials are also susceptible to damage when stored on a construction site where there is a lot of activity.

U.S. Pat. No. 4,851,274 also teaches a moldable fibrous composite material having thermal and acoustical insulating properties but this material is a multi-layer material which is costly to fabricate. Also, the material can detach along the layered surfaces. It teaches the consolidation of the composition layers by the use of needle-punching. Needle punching binding has been known in the art for quite some time. However, there is a need to provide a similar material and which is homogeneous throughout and providing good mechanical properties, in all directions, thereby resisting decomposition or splitting during application and use and which can further provide insulating and acoustical properties without having the need to be incorporated into a multi-layer structure and without having to impregnate the synthetic fibers with chemical products.

With the advent of higher population density in urban areas there is a desire to insulate dwellings and offices to provide better sound absorption. Occupants of such buildings are more and more exposed to sounds by a multitude of environmental noise-generating sources such as televisions, congregation of children, radio, sound systems, electrical tools, telephones, traffic noise, and noise generated by walking on hard floor surfaces for example. In order to enhance the environment of the occupants of these buildings and offices new building codes have been applied. These codes place a restriction on the intensity of sounds to be generated in a an occupied environment. At the same time research is being done in order to diminish the cost of sound absorbing material while maintaining a high sound absorption performance.

In view of the above, there is a need to provide a new material, at low cost, which is easy to install and which is efficient in attenuating sound. There is also a need to provide a material which is also sound and thermal insulating.

SUMMARY OF THE INVENTION

It is therefore a feature of the present invention to provide a non-woven synthetic sheet material which is needle-punched and which is homogeneous throughout and provides good mechanical properties, in all directions, to resist decomposition or splitting during application or use, and which further provides for excellent sound insulation and which can be fabricated in different density depending on the intended use of the material.

Another feature of the present invention is to provide a non-woven synthetic sheet material for use in sound and/or thermal insulation and wherein the sheet material has a polymeric film, secured by needle punch, to one of its surfaces.

Another feature of the present invention is to provide a non-woven synthetic sheet material for use in sound and/or thermal insulation and wherein the material has a sheet density in the range of from about 100 to 1500 $g/m^2$ and has a homogeneous mechanical integrity resistant to fragmentation when subjected to traction forces during its intended use so that the material is less susceptible to damage when manipulated during installation, fabrication or transport.

Another feature of the present invention is to provide a non-woven synthetic sheet material for use in sound and/or thermal insulation and wherein the material has a multitude of applications in the construction industry and can be secured about conduits which are noise generating and/or thermally inefficient whereby to reduce noise and render them more thermal efficient.

According to the above features, from a broad aspect, the present invention provides a non-woven synthetic sheet material for use in construction for sound insulation. The sheet material is a felt of synthetic fibers of substantially uniform thickness and defining opposed flat surfaces. The sheet material is needle-punched from at least one of the opposed flat surfaces thereof to cause the synthetic fibers to intertwine to form a pliable sound insulating sheet. The sound insulating sheet has a density of the range of from about 100 to 1500 $g/m^2$ and a homogeneous mechanical integrity resistant to fragmentation by the application of traction forces during its intended use.

According to a further broad aspect of the present invention there is provided a non-woven synthetic sheet material for use in construction for thermal insulation. The sheet material is a felt of synthetic fibers of substantially uniform thickness and defining opposed flat surfaces. The sheet material is needle-punched from at least one of the opposed flat surfaces thereof to cause the synthetic fibers to intertwine to form a pliable thermal insulating sheet. The thermal insulating sheet has a density in the range of from about 100 to 1500 $g/m^2$, and an homogeneous mechanical integrity resistant to fragmentation by the application of traction forces applied thereto during its intended use.

BRIEF DESCRIPTION OF THE DRAWINGS

A preferred embodiment of the present invention will now be described with reference to the examples thereof as illustrated by the accompanying drawings in which.

DESCRIPTION OF PREFERRED EMBODIMENTS

Figure 1:
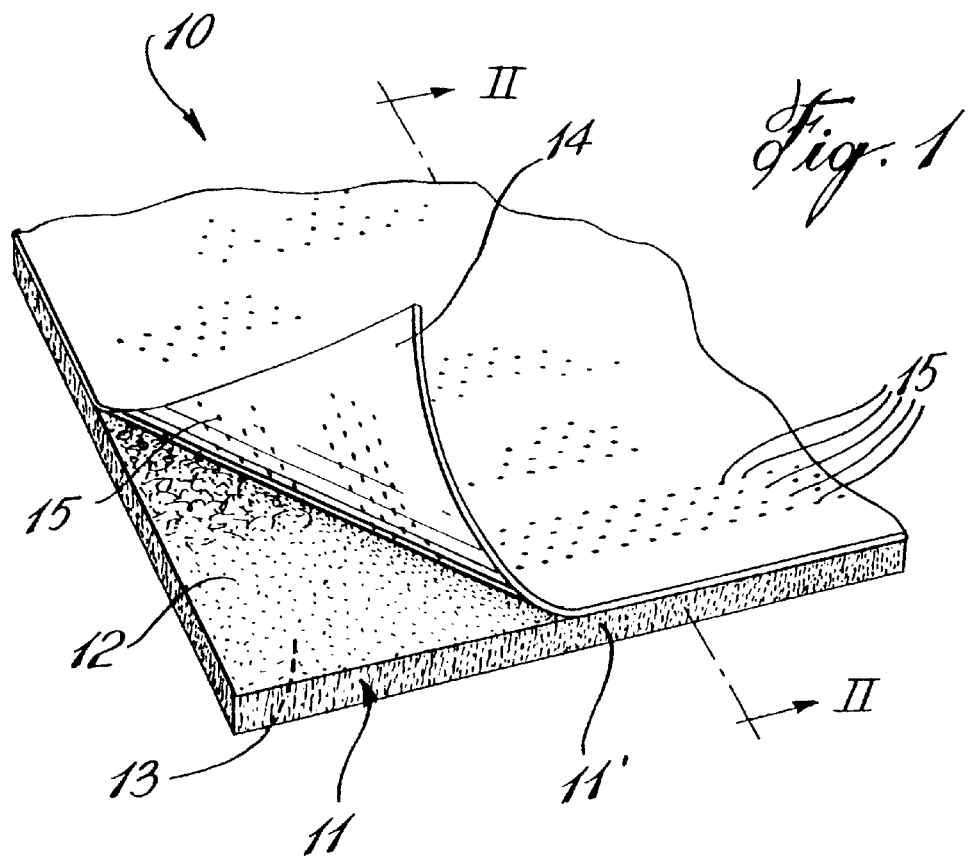
FIG. 1 is a perspective view showing a non-woven synthetic sheet material constructed in accordance with the present invention.

Referring now to FIG. 1 there is shown generally at 10 the sound and/or thermal insulating, non-woven, synthetic sheet material of the present invention. The sheet material 10 is a felt or mat having a substantially uniform thickness of synthetic fibers 11 and defines opposed flat surfaces, namely a top surface 12 and a bottom surface 13. The sheet material 11 is maintained homogeneous by needle punching, not shown herein but well known to a person skilled in the art, whereby the fibers intertwine together to maintain a homogeneous consistency. The sheet 11 is also formed with a weight density in the range of from about 100 to 1500 g/m² dependent on the application and sound absorbing characteristics desired for the synthetic sheet material to be produced. The sheet 11 may be formed to be very pliable permitting it to be rolled about curved objects such as plumbing conduits that generate noise due to the circulation of water therein, curved surfaces, the insulation of irregular shaped enclosures such as sound generating construction appliances, etc.

Figure 2:
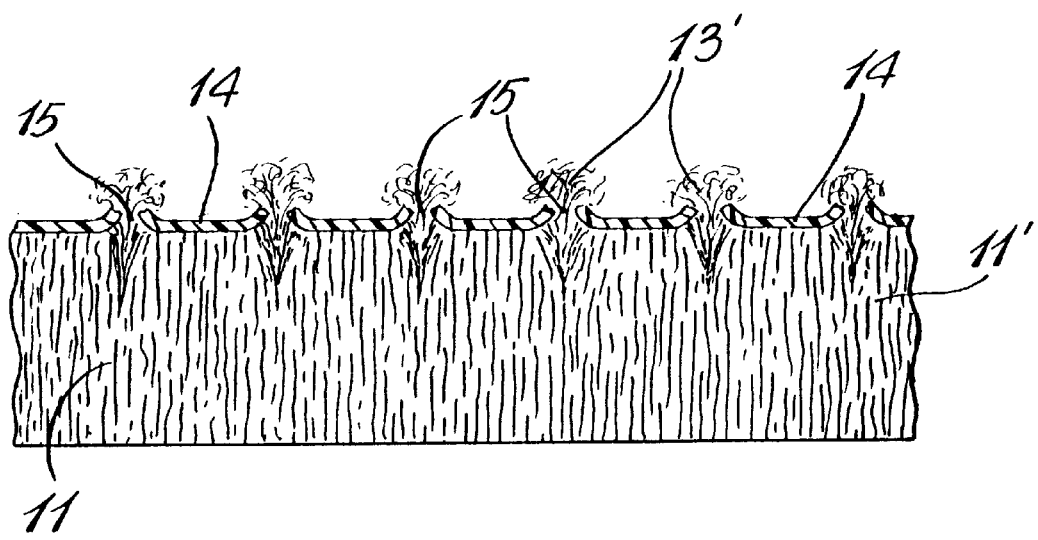
FIG. 2 is a section view along section lines II—II of FIG. 1 but showing only a fragmented portion thereof.

Preferably, a polymeric film 14 is attached to one of the opposed flat surfaces 12 and 13, herein the top surface 12 by means of a further needle punch step whereby some of the fibers 11' in the immediate region of the synthetic sheet 14, as shown in FIG. 2, protrude through the orifices 15 formed in the film sheet by the needle punching to interconnect with the surface sheet. The top sheet layer 11 also preferably has a thickness of from 0.5 mil to 5.0 mils. The complete thermal acoustic sheet 10 as shown in FIG. 2 has a thickness in the range of from about 3 to 15 mm.

The non-woven synthetic fiber sheet 11 is preferably constituted of polypropylene and/or polyester fibers and its weight can vary between 500 g/m² to 2000 g/m² but preferably within the range of about 100 to 1500 g/m². The homogeneous integrity of the sheet which makes it resistant to fragmentation increases with the quantity of fibers 11' which traverse the orifices 15 of the top sheet and more generally with the parameters of the needle punching machinery. The non-woven synthetic sheet material as herein described, for use in the construction industry for sound and/or thermal insulation, is fabricated by a standard process wherein polypropylene or polyester fibers of substantially equal lengths or variable lengths and preferably but not exclusively having a length of 4 inches and a size of preference between 5 and 6 deniers are introduced in the form of a fiber mat in a sheet forming machine wherein the fibers are deposited to form a fiber sheet of a predetermined thickness and density. At the outlet of the machine the fiber mat is subjected to a needle punching process and this may be effected by a plurality of needle rolls. A film is then deposited over the mat and on the top flat surface thereof and again the mat and the polyethylene film are subjected to a further needle punch process. During this further stage the sheet becomes more rigid due to the fact that fibers in the top portion of the fiber layer 11 are caused to rise through the orifices formed in the polyethylene sheet to cause the sheet to be interconnected with the top surface layer.

As described above, depending on the application of the non-woven synthetic sheet material it may not be necessary to interconnect a polyethylene sheet on the top surface of the mat. For example, as shown in FIG. 3B, if the non-woven synthetic sheet material mat 10' is utilized as a sound dampening sub-surface on a plywood floor 16 and sandwiched between two plywood sheets 16 and 16', the ceramic tiles 17 secured thereover would be sound proofed from the living area 18 therebelow. The synthetic sheet material mat in either of its forms, either with or without a polymeric film attached to its surface may also be glued on a concrete slab as shown at 19 in FIG. 3A or on a cement wall surface 20, as shown in FIG. 3C, to provide sound absorption. It may also be affixed to opposed surfaces of a concrete block wall 20' as shown in FIG. 3C, which is desired when separating two dwellings from one another.

Figure 3:
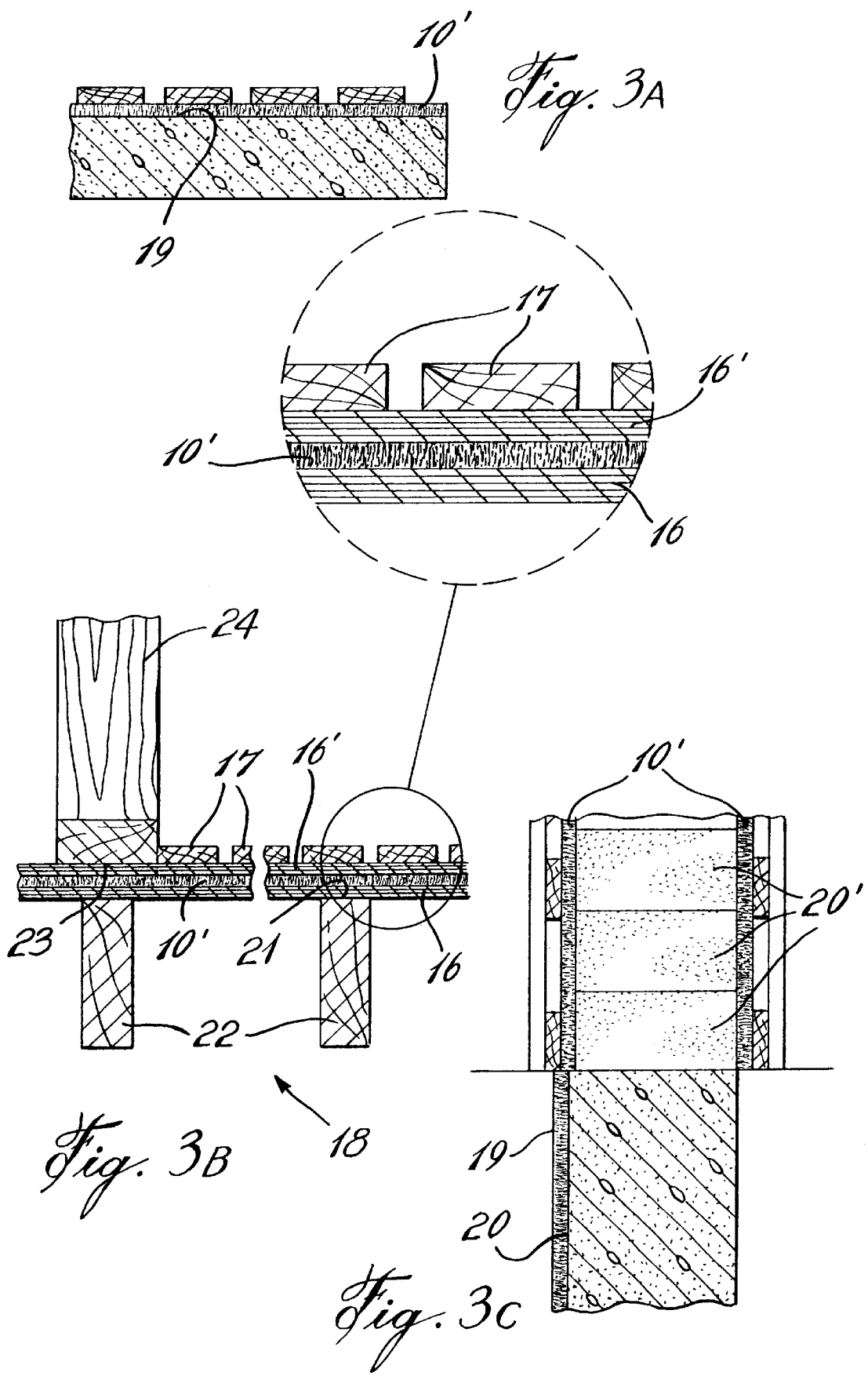
FIGS. 3a to 3c are a fragmented section views showing various applications of the sound and/or thermal insulating synthetic sheet material as used in the construction industry.
Figure 4:
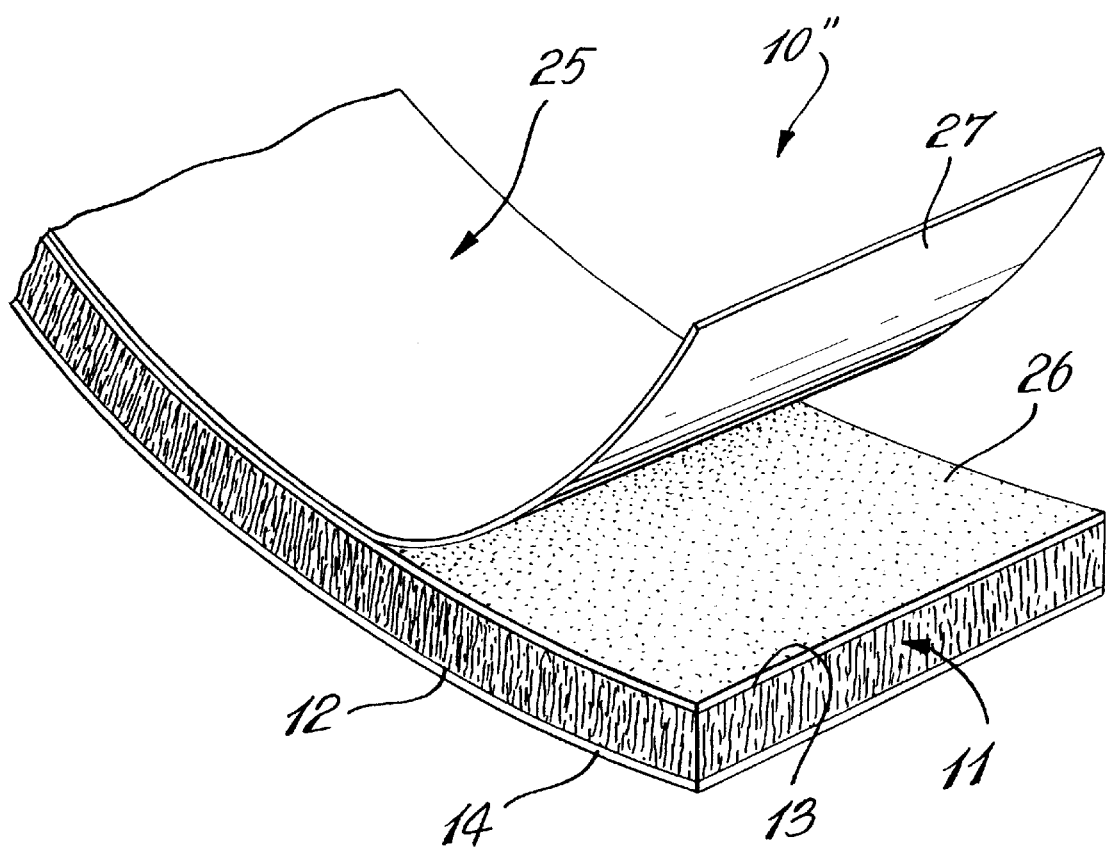
FIG. 4 shows the sound and/or thermal insulating sheet material of the present invention as supplied in strip form.

As shown in FIG. 4 the non-woven synthetic sheet material mat 10" is herein shown as being formed in strip form and it may be rolled upon itself and shipped in such roll form. A utility for such strips is shown in FIG. 3B, where the strip is installed on the top surface 21 of construction floor joists 22 or on the bottom surfaces 23 of partition or load bearing walls 24 to absorb vibrations and eliminate sound transmission by vibrations usually transmitted through these interconnected materials in wood framed structures. When the product is in strip form as shown in FIG. 4, a double adhesive tape 25 having an adhesive substrate 26 and a release sheet 27 may be secured to the bottom surface 13 of the synthetic fiber layer 11. Also, the polymeric sheet 14 may also be secured to the top surface 12 but this is most likely not necessary for the application as above described.

It is also pointed out that different additives or composites can be incorporated within the synthetic fibers or on its opposed surfaces in order to optimize the mechanical and/or thermal and/or static or fire proofing properties of the material. The polymeric film could also be replaced by a thin aluminum sheet adhered to the surface by needle punching or other means.

The thickness of the synthetic sheet material in usual residential or commercial building structures is between 1 and 15 mm and preferably between 4 and 6 mm when utilized in applications as illustrated in FIGS. 3.

In the installation of the sheet material when utilized as a sound insulating sheet, the sheet is cut to the proper size of the floor surface to be insulated. The cutting of the sheet can be done with scissors normally used for cutting carpeting or an Exacto knife as is well known in the art. The insulating sheet material can be simply laid down on the surface or else glued on the surface or simply disposed on objects, such as the floor joists 22.

Following are examples of methods of use of the non-woven synthetic sheet material for sound and thermal insulation.

EXAMPLE I

The surface is a concrete floor surface to which it is desirable to secure a ceramic tile floor. The non-woven synthetic sheet material of the present invention fabricated with or without a polymeric film is applied to the concrete surface. A plywood sheet material is applied on the top surface of the synthetic sheet material or on the polymeric film if secured thereto. Ceramic tiles are then applied to the top of the plywood sheet using standard practice.

EXAMPLE II

In this application the synthetic sheet material, in strip form, is disposed on the top surface of floor joists and the bottom surface of the floor sheeting material is secured to the floor joists by fasteners, as is well known in the art. Thus, the sheet material strip provides vibrations and sound damping between the floor sheeting and support joists.

EXAMPLE III

The non-woven synthetic sheet material has a metalized polyethylene film sheet and it is glued directly on a concrete wall surface to provide sound and thermal insulation.

EXAMPLE IV

The non-woven synthetic sheet material is glued directly on a partition wall formed of concrete blocks to sound insulate two dwellings. Nailing strips are then secured over the synthetic sheet material to support a finish wall board surface, preferably a gypsum board and this is applied to both sides of the concrete block wall to provide a double insulating layer separated by air and the concrete blocks. Accordingly, excellent sound damping is achieved.

A non-woven synthetic sheet was constructed in accordance with the present invention and formed of a synthetic fiber sheet of substantially uniform thickness and having a polyethylene film attached to one of its opposed surfaces. The polyethylene sheet was 50 μm in thickness and colored yellow. The non-woven fabrics were constituted by 100% polypropylene fibers. The synthetic sheet material had a thickness of 6 mm and a weight of 1000 g/m$^2$. This sheet material was tested by Architectural Acoustic Lab 3D according to the following test parameters ASTM E-336-90: Measure of aerial sound insulation in a building ASTM E-413-87: Determination of the STC index ASTM E-1007-90: Measure of sound dampening to noise caused by an abrupt noise in a building ASTM E-989-89: Determination of the IIC index ISO 3382: 1975: Measure of sound reverberation in auditoriums The parameters of the instrumentation utilized were CEI 225 (1996): using filters of an octave and half octave frequencies and other octaves, which are used to analyze sound and vibrations.

The characteristics of the test apparatus utilized for the experimentation are setforth in the enclosed table:

| DESCRIPTION | MODEL | SPECIFICATION | |
|---|---|---|---|
| Acoustic analyzer-architectural | Brüel & Kjaer #4417 | ISO 140-1 to 8: | 1978 |
| | | ISO 140-9: | 1985 |
| | | ISO 717-1 to 3: | 1982 |
| | | ISO 354: | 1985 |
| | | ISO 3382 | 1975 |
| | | ISO 3741 | 1988 |
| | | ISO 3742 | 1988 |
| Alphanumeric printer | Brüel & Kjaer #2312 | | |
| Sound generator | Brüel & Kjaer #4224 | ASTM E 597-87 | |
| Sound generating machine | Brüel & Kjaer #3204 | ISO 140-1 to 8: ISO 140-9 | 1978 |
| Microphone preamplifier | Brüel & Kjaer #2619 | | |
| Microphones ½" | Brüel & Kjaer # | | |
| Step sound generator | Brüel & Kjaer #4230 | | |

The above-mentioned instruments are necessary to perform the analysis of the ISO (International Standard and Recommendations) specification and the ASTM (American Society For Testing and Materials) specifications.

The acoustic tests were effected in a controlled environment which met the specifications of the above-referred to standards. The results of the acoustic performance were measured on surfaces of the following elements:
1) a wood structure,
2) an insulated wood structure
3) an installed membrane consisting of the non-woven synthetic sheet material Tech-1600 of the present invention
4) on a 8 inch concrete slab.

The FSTC was found to be approximately 58 and the FIIC approximately 63. These acoustic results show that the membrane of the present invention is superior to various known products that are now on the market such as Enkasonic® and Acousti-mat®. Further, the membrane of the present invention is inferior in price to known existing competitive products. The membrane of the present invention is also very easy to install, can be supplied in roll form and can be easily cut with complex curves using ordinary carpet scissors or an Exacto knife. The membrane also has a low weight density and is very durable.

It is pointed out that the membrane constructed in accordance with the present invention achieves all technical characteristics for its application to existing market demands and particularly for covering residential and commercial construction surfaces on which it is desirable to obtain sound absorption and other construction materials. The membrane also has a long life and is very durable. The membrane can also be installed by non-professionals and requires very little time for such installations.

It is within the ambit of the present invention to cover any obvious modifications of the preferred embodiment described herein providing such modifications fall within the scope of the appended claims. It is also pointed out that the membrane has several other applications not described herein but which become obvious to a person skilled in the art. Therefore, the applications described herein are not to be construed as limiting.

What is claimed is:

1. A non-woven synthetic sheet materials for use in the construction of building structures for sound insulation of impact noise generated on a surface material disposed over said sheet material, said sheet material being a single felt of similar synthetic fibers of substantially uniform thickness and defining opposed flat surfaces, said sheet material being needle-punched from at least one of said opposed flat surfaces thereof and throughout said uniform thickness to cause said synthetic fibers to intertwine to form a pliable sound insulating sheet; said sound insulating sheet having a weight density in the range of from about 100 to 1500 g/m$^2$, and having a homogeneous mechanical integrity resistance to fragmentation by the application of traction forces applied thereto during its intended use; and further wherein a metalized polymeric film is secured by needle-punch to one of said opposed flat surfaces, wherein fibers project over said metalized polymeric film for contact with adhesive to enhance bonding with said surface material, said metalized polymeric film being in contact with said surface material to reflect thermal radiation there from, said polymeric film has a thickness in the range of from about 0.5 mil to 5.0 mils.

2. A sound insulating synthetic sheet material as claimed in claim 1 wherein said polymeric film is secured to said one of said opposed flat surfaces by a further needle-punch step or steps whereby said fibers and film interconnect by fibers in an immediate region of said synthetic sheet material adjacent said polymeric film by protruding fibers extending through orifices formed in said film by said needle-punching.

3. A sound insulating synthetic sheet material as claimed in claim 2 wherein said synthetic sheet material has a thickness of 1 to 15 mm.

4. A sound insulating synthetic sheet material as claimed in claim 1 wherein said synthetic sheet material is a thermo-acoustic sheet material.

5. A sound insulating synthetic sheet material as claimed in claim 4 wherein said thermo-acoustic sheet material has a thickness in the range of from about 1 to 15 mm.

6. A sound insulating synthetic sheet material as claimed in claim 1 wherein said non-woven synthetic sheet material is a strip of sheet material having a thickness in the range of from about 1 to 15 mm.

7. A sound insulating synthetic sheet material as claimed in claim 6 wherein said strip is provided with an adhesive binder on a rear one of said opposed flat surfaces for securing said strip to a surface to be sound and/or thermally insulated.

* * * * *